US012202009B2

(12) United States Patent
Ukai et al.

(10) Patent No.: US 12,202,009 B2
(45) Date of Patent: Jan. 21, 2025

(54) METHOD FOR FORMING MULTILAYER COATING FILM

(71) Applicant: KANSAI PAINT CO., LTD., Hyogo (JP)

(72) Inventors: Yoshiaki Ukai, Aichi (JP); Hiroyuki Tsuji, Aichi (JP); Kazutaka Ogura, Aichi (JP); Naoto Matsushima, Aichi (JP)

(73) Assignee: KANSAI PAINT CO., LTD., Hyogo (JP)

( * ) Notice: Subject to any disclaimer, the term of this patent is extended or adjusted under 35 U.S.C. 154(b) by 118 days.

(21) Appl. No.: 17/778,506

(22) PCT Filed: Jul. 9, 2020

(86) PCT No.: PCT/JP2020/026922

§ 371 (c)(1),
(2) Date: May 20, 2022

(87) PCT Pub. No.: WO2021/100238

PCT Pub. Date: May 27, 2021

(65) Prior Publication Data

US 2022/0410210 A1 Dec. 29, 2022

(30) Foreign Application Priority Data

Nov. 22, 2019 (JP) ................................ 2019-211244

(51) Int. Cl.
*B05D 5/06* (2006.01)
*B05D 3/02* (2006.01)
*B05D 7/00* (2006.01)

(52) U.S. Cl.
CPC ................ *B05D 5/06* (2013.01); *B05D 3/02* (2013.01); *B05D 7/572* (2013.01); *B05D 7/576* (2013.01)

(58) Field of Classification Search
CPC ........... B05D 5/06; B05D 3/02; B05D 7/572; B05D 7/576
See application file for complete search history.

(56) References Cited

U.S. PATENT DOCUMENTS

| | | | | |
|---|---|---|---|---|
| 2005/0214483 | A1 | 9/2005 | Fujieda et al. | |
| 2011/0318570 | A1 | 12/2011 | Ryuzaki et al. | |
| 2015/0004424 | A1* | 1/2015 | Kruesemann | C09D 5/004 524/40 |
| 2016/0288164 | A1* | 10/2016 | Sato | B05D 7/576 |
| 2017/0001217 | A1 | 1/2017 | Fujiwara | |
| 2017/0297052 | A1* | 10/2017 | Shinkoda | B05D 7/57 |

FOREIGN PATENT DOCUMENTS

| | | |
|---|---|---|
| CN | 106000832 | 10/2016 |
| JP | 2000-279877 | 10/2000 |
| JP | 2001-314807 | 11/2001 |
| JP | 2007-167720 | 7/2007 |
| JP | 2010-209167 | 9/2010 |
| JP | 4886994 | 2/2012 |
| JP | 2014-4552 | 1/2014 |
| JP | 2016-83631 | 5/2016 |
| WO | 2015/099150 | 7/2015 |

OTHER PUBLICATIONS

International Search Report issued Sep. 8, 2020 in corresponding International (PCT) Application No. PCT/JP2020/026922, with English translation.
Notice of Reasons for Revocation issued Sep. 16, 2021 in corresponding Japanese Patent Application No. 2020-553675 (Japanese Patent No. 6805401), with English translation.
Opponent's Exhibit No. 1, Certificate of experimental results, May 10, 2021, prepared by Naoya Sakai, employee at BASF Japan Ltd., with English translation.
Opponent's Exhibit No. 6, Database "Color Explorer Online", https://www.rmpaint.com/jp/welcome-r-m (Japanese front page).
Opponent's Exhibit No. 7-1, Formulation of a colored paint "Onyx HD" in "Color Explorer Online", "1LE Suzuki Blue Pearl Met", https://colorexplorer.rmpaint.com/index.php?language=8.
Opponent's Exhibit No. 7-2, Formulation of a colored paint "Onyx HD" in "Color Explorer Online", "YKY Suzuki Vigor Blue Mica Met", https://colorexplorer.rmpaint.com/index.php?language=8.
Opponent's Exhibit No. 7-3, Formulation of a colored paint "Onyx HD" in "Color Explorer Online", "E1 Kawasaki Candaylightning Blue M", https://colorexplorer.rmpaint.com/index.php?language=8.
Opponent's Exhibit No. 7-4, Formulation of a colored paint "Onyx HD" in "Color Explorer Online" "Honda B510P Long Beach Blue Pearl", https://colorexplorer.rmpaint.com/index.php?language=8.
Opponent's Exhibit No. 7-5, Formulation of a colored paint "Onyx HD" in "Color Explorer Online" "Nissan B17 Blue Pearl Met", https://colorexplorer.rmpaint.com/index.php?language=8.
Opponent's Exhibit No. 8-1, "Technical Information" Onyx HD in "Color Explorer Online", https://techinfo.rmpaint.com/en_UK/documents/pdf/tech_infos/ONYX_HD.pdf.
Opponent's Exhibit No. 8-2, "Technical Information" Onyx HD in "Color Explorer Online", https://techinfo.rmpaint.com/ja_JP/documents/pdf/tech_infos/ONYX_HD.pdf.
Opponent's Exhibit No. 9, "Technical Information" Evertop C 1650 in "Color Explorer Online", https://techinfo.rmpaint.com/ja_JP/documents/pdf/tech_infos/EVERTOP_C1650.pdf, with partial English translation.

(Continued)

*Primary Examiner* — Dah-Wei D. Yuan
*Assistant Examiner* — Kristen A Dagenais
(74) *Attorney, Agent, or Firm* — Wenderoth, Lind & Ponack, L.L.P.

(57) ABSTRACT

A method for forming a multilayer coating film, comprising sequentially applying a first colored paint (X), a second colored paint (Y), and a clear paint (Z) to a substrate, and heating the three layers of the obtained multilayer coating film separately or simultaneously to cure these layers. The first colored coating film has a lightness L* within the range of 30 to 60, the second colored coating film has a light transmittance at a wavelength of 400 nm or more and 700 nm or less within the range of 15% or more and less than 30%, and |h(X)−h(S)|, which is a difference between a hue angle h in the L*C*h color space diagram of the first colored coating film (h(X)) and a hue angle h in the L*C*h color space diagram of the multilayer coating film (h(S)), is within the range of 0 to 30.

6 Claims, No Drawings

(56) References Cited

OTHER PUBLICATIONS

Opponent's Exhibit No. 10-1, Figure showing each color of "Onyx HD" on "Chromatic Circle" in "Color Explorer Online", https://colorexplorer.rmpaint.com/addinfo/index.php?language=8.
Opponent's Exhibit No. 10-2, Search information on aluminum pigment (luster pigment) of "Onyx HD in" Color Explorer Online, https://color-explorer.rmpaint.com/addinfo/index.php?language=8.
Opponent's Exhibit No. 10-3, Search results of light interference pigment (luster pigment) contained in "Onyx HD" in "Color Explorer Online," https://colorexplorer.rmpaint.com/addinfo/index.php?language=8.
Opponent's Exhibit No. 10-4, "Safety Data Sheet" for "HB 444", https:/msds.rmpaint.com/files/50412021_MSDS_JP_JA.PDF.
Opponent's Exhibit No. 10-5, "Safety Data Sheet" for "HB 460", https://msds.rmpaint.com/files/50412021_MSDS_JP_JA.PDF.
Opponent's Exhibit No. 10-6, "Safety Data Sheet" for "HB 471", https:/msds.rmpaint.com/files/50412021_MSDS_JP_JA.PDF.
Opponent's Exhibit No. 11, Onyx-HD primary color property table/crystal base primary color property table.
Opponent's Exhibit No. 12-1, Citation from website of BASF group, coatings division, Automotive Refinish section https:/www.rmpaint.com/jp/who-we are#our%20history.
Opponent's Exhibit No. 12-2, monthly "Body Shop Report", August issue, 2007, p. 128.
Opponent's Exhibit No. 12-3, Eco Mark Product, Certification Nikkan Eco No. 160514171, May 13, 2016, Japan Environment Association.
Opponent's Exhibit No. 12-4, Guidance for the Eco Mark, May 2021, Japan Environment Association.
Opponent's Exhibit No. 12-5, R-M Onyx HD new primary color "HB832 Organic Red 2 0.5L R2" release information, May 2016, BASF Japan Ltd.
Opponent's Exhibit No. 12-6, R-M Onyx HD new primary color "HB994" release information, Sep. 2015, BASF Japan Ltd.
Opponent's Exhibit No. 12-7, "Notice of Product Name Change", Aug. 30, 2004, BASF NOF Coatings Co., Ltd.
Opponent's Exhibit No. 13-1, Citation from website of BASF group, coatings division, Automotive Refinish section https://www.rmpaint.com/jp/who-we-are#our%20history.
Opponent's Exhibit No. 13-2, Cited pages from website of non-profitable organization "Internet Archive" https://archive.org/?form=MY01SV&OCID=MY01SV.
Opponent's Exhibit No. 13-3, Record information of nonprofitable organization "Internet Archive" https://web.archive.org/web/20170625071630/https://www.rmpaint.com/jp/color-universe.
Opponent's Exhibit No. 14, Material having operation procedure written therein on "Color Explorer Online" cited page https://www.rmpaint.com/jp/welcome-r-m.
Opponent's Exhibit No. 15, Oath by Eva Schlinger, employee at color science division, BASF group, Jun. 2021.
Opponent's Exhibit No. 16, Oath by Christoph Evringmann, employee at digital related division, BASF group, Jun. 2021.
Attachment 1 of Opponent's Exhibit No. 1, "Onyx-HD primary color property table/crystal base primary color property table", issued by BASF Japan Ltd., coatings division, Automotive Refinish section.
Attachment 2 of Opponent's Exhibit No. 1, "BASF Safety Data Sheet" date/revision: Mar. 4, 2021, version: 58.0, product: HB 444 0.5L Royal Blue R2/HB 444, Royal Blue.
Attachment 3 of Opponent's Exhibit No. 1, "BASF Safety Data Sheet" date/revision: Feb. 1, 2021, version: 54.0, product: HB 460 0.5L R2/HB 460, Phthalo Blue 2.
Attachment 4 of Opponent's Exhibit No. 1, "BASF Safety Data Sheet" date/revision: Dec. 3, 2020, version: 54.0, product: HB 300 0.5L violet R2/HB 300, Violet.
Attachment 5 of Opponent's Exhibit No. 1, "BASF Safety Data Sheet" date/revision: Dec. 3, 2020, version: 42.0, product: HB 832 0.5L organic red 2 R2/HB 832, Organic Red 2 R2.
Attachment 6 of Opponent's Exhibit No. 1, "BASF Safety Data Sheet" date/revision: Feb. 1, 2021, version: 60.0, product: HB 471 0.5L greenish phth. blue R2/HB 471, Phthalo Blue 3.
Attachment 7 of Opponent's Exhibit No. 1, "BASF Safety Data Sheet" date/revision:Dec. 3, 2020, version: 41.0, product: HB 259 0.5L black tint R2/HB 259, Black Tint.
Attachment 8 of Opponent's Exhibit No. 1, "BASF Safety Data Sheet" date/revision: Feb. 11, 2021, version: 55.0, product: HB 999 0.5L tint white R2/HB 999, Tint White.
Attachment 9 of Opponent's Exhibit No. 1, "BASF Safety Data Sheet" date/revision: Jan. 22, 2021, version: 54.0, product: HB 120 0.5L fine round aluminum R2/HB 120, Fine Round Aluminum.
Attachment 10 of Opponent's Exhibit No. 1, "BASF Safety Data Sheet" date/revision: Dec. 3, 2020, version: 51.0, product: HB 130 1L fine aluminium R2/HB 130, Fine Aluminum.
Attachment 11 of Opponent's Exhibit No. 1, "BASF Safety Data Sheet" date/revision: Feb. 1, 2021, version: 57.0, product: HB 150 0.5L med round aluminium R2/HB 150, Medium Round Aluminum.
Attachment 12 of Opponent's Exhibit No. 1, "BASF Safety Data Sheet" date/revision: Mar. 4, 2021, version: 49.0, product: CB 47M 0.125L gentian blue pearl/CB 47M, Galaxy Blue.
Attachment 13 of Opponent's Exhibit No. 1 "BASF Safety Data Sheet" date/revision: Jan. 22, 2021, version: 55.0, product: HB 994 1L marble white R2/HB 994, Marble White.
Attachment 14 of Opponent's Exhibit No. 1, "BASF Safety Data Sheet" date/revision: 03.12.2020, version: 44.0, product: HB 46L 0.5L R2/HB 46L, Blue Pearl 2.
Attachment 15 of Opponent's Exhibit No. 1, "BASF Safety Data Sheet" date/revision: Mar. 4, 2021, version: 53.0, product: HB 002 5L Hydrobase Onyx R2/HB 002, Hydrobase.
Attachment 16 of Opponent's Exhibit No. 1 "BASF Safety Data Sheet" date/revision: Feb. 25, 2021, version: 39.0, product: HB 100 0.5L mixing clear R2/HB 100, Mixing Clear.
Attachment 17 of Opponent's Exhibit No. 1, "BASF Safety Data Sheet" date/revision: Jan. 22, 2021, version: 53.0, product: HB 090 0.5L pitch control/HB090, Pitch Control.
Attachment 18 of Opponent's Exhibit No. 1, technical information Onyx HD Dec. 2017.
Attachment 19 of Opponent's Exhibit No. 1, technical information Evertop C1650 Jan. 2019.
Attachments 1 and 2 of Opponent's Exhibit No. 14, with English translation.

* cited by examiner

METHOD FOR FORMING MULTILAYER COATING FILM

CROSS-REFERENCE TO RELATED PATENT APPLICATION

The present application claims priority to the specification of Japanese Patent Application No. 2019-211244, filed on Nov. 22, 2019 (the entire disclosure of which is incorporated in the present specification by reference). The present invention relates to a method for forming a multilayer coating film.

BACKGROUND ART

For exterior colors of industrial products such as automobiles, paint colors with a high chroma and excellent darkness are highly demanded by users as paint colors with a sense of luxury and excellent attractiveness.

As a method for obtaining such a paint color with a high chroma and excellent darkness, a method for forming a multilayer coating film, comprising sequentially applying a first colored paint, a second colored paint having transparency, and a clear paint has been disclosed.

For example, Patent Literature (PTL) 1 discloses a method for forming a multilayer coating film with sophisticated designs, comprising the steps of: applying a first paint containing a color component and/or an effect material to the surface of a substrate to form a first coating film, applying a second paint containing a color component in an amount of 0.01 to 1 wt % based on the resin solids content of the paint to the first coating film to form a second coating film without heat-curing the first coating film, and applying a clear paint to the second coating film to form a clear coating film without heat-curing the second coating film. However, although the coating film obtained by this method has a high chroma, the darkness is insufficient; additionally, color unevenness and color change due to film thickness change are sometimes observed.

CITATION LIST

Patent Literature

PTL 1: JP2001-314807A

SUMMARY OF INVENTION

Technical Problem

An object of the present invention is to provide a method for forming a multilayer coating film, the method being capable of eliminating the above defects and forming a multilayer coating film having a high chroma, excellent darkness, reduced color unevenness, and reduced color change due to film thickness change.

Solution to Problem

The present invention encompasses the subject matter stated in the following items.

Item 1. A method for forming a multilayer coating film, comprising step (1): applying a first colored paint (X) containing an effect pigment and a color pigment to form a first colored coating film, step (2): applying a second colored paint (Y) containing a color pigment to the first colored coating film to form a second colored coating film, step (3): applying a clear paint (Z) to the second colored coating film to form a clear coating film, and step (4): heating the first colored coating film formed in step (1), the second colored coating film formed in step (2), and the clear coating film formed in step (3) separately or simultaneously to cure these coating films, wherein the first colored coating film has a lightness L* within the range of 30 to 60, the second colored coating film has a light transmittance at a wavelength of 400 nm or more and 700 nm or less within the range of 10% or more and less than 30%, and $|h(X)-h(S)|$, which is a difference between a hue angle h in the L*C*h color space diagram of the first colored coating film (h(X)) and a hue angle h in the L*C*h color space diagram of the multilayer coating film (h(S)), is within the range of 0 to 30.

Item 2. The method for forming a multilayer coating film according to Item 1, wherein the multilayer coating film obtained by the method for forming a multilayer coating film has a hue angle h (h(S)) in the L*C*h color space diagram within the range of 225 to 315.

Item 3. The method for forming a multilayer coating film according to Item 1 or 2, wherein the color pigment in the first colored paint (X) and the color pigment in the second colored paint (Y) contain a phthalocyanine pigment.

Item 4. The method for forming a multilayer coating film according to any one of Items 1 to 3, wherein the effect pigment contained in the first colored paint (X) contains a colored aluminum pigment.

Item 5. The method for forming a multilayer coating film according to any one of Items 1 to 4, wherein the second colored paint (Y) contains the color pigment in a pigment mass concentration within the range of 0.1 to 10%.

Item 6. The method for forming a multilayer coating film according to any one of Items 1 to 5, wherein the second colored paint (Y) further contains an effect pigment.

Item 7. The method for forming a multilayer coating film according to Item 6, wherein the second colored paint (Y) contains the effect pigment in a pigment mass concentration within the range of 1.2 to 5%.

Advantageous Effects of Invention

The method for forming a multilayer coating film of the present invention is capable of forming a multilayer coating film having a high chroma, excellent darkness, reduced color change, and reduced color unevenness due to film thickness change.

DESCRIPTION OF EMBODIMENTS

Step (1)

According to the method of the present invention, in step (1), a first colored paint (X) is first applied to form a first colored coating film. The first colored paint (X) is a paint that imparts hiding power and determines the hue of the resulting multilayer coating film. The first colored paint (X) contains an effect pigment and a color pigment.

The first colored coating film is characterized by having a lightness L* in the L*C*h color space within the range of 30 to 60.

The L*C*h color space is a polar coordinates version of the L*a*b* color space, which was standardized in 1976 by the Commission Internationale de l'Eclairage, and also adopted in JIS Z 8781-4(2013). The value of L* represents lightness. The value of C* represents chroma, which is a distance from the starting point. The value of h represents the hue angle that starts at 0° from the axis in the a* red direction, and moves counterclockwise in terms of hue in the L*a*b* color space.

In the present specification, the lightness L*, the chroma C*, and the hue angle h are values calculated from a reflectance measured with a spectrophotometer equipped with an integrating sphere (mode excluding specular reflection light).

Examples of the spectrophotometer equipped with an integrating sphere include CR-400 and CR-410 (trade names, produced by Konica Minolta, Inc.).

The upper limit of the lightness L* in the L*C*h color space of the first colored coating film is not particularly limited as long as it is 60 or less. For example, the upper limit is preferably 50 or less, and more preferably 45 or less. The lower limit of the lightness L* in the L*C*h color space of the first colored coating film is not particularly limited as long as it is 30 or more, and is, for example, preferably 32 or more, and more preferably 35 or more. The lightness L* of the first colored coating film is preferably within the range of 32 to 50, and more preferably within the range of 35 to 45. From the standpoint of, for example, improving the chroma and darkness of the resulting multilayer coating film, and suppressing color unevenness and color change due to film thickness change, the first colored coating film preferably has a lightness L* within the above ranges.

In addition, the hue angle h of the first colored coating film (h(X)) is preferably within the range of 225 to 315, more preferably within the range of 240 to 310, and still more preferably within the range of 255 to 305, from the standpoint of, for example, suppressing color change due to film thickness change.

Examples of the effect pigment contained in the first colored paint (X) include aluminum pigments, vapor deposition metal flake pigments, and interference pigments. Of these, aluminum pigments are preferred from the standpoint of darkness etc. of the resulting multilayer coating film. The aluminum pigments are preferably aluminum flakes. These pigments may be appropriately used singly or in a combination of two or more.

The aluminum pigment is typically produced by crushing and grinding aluminum using a grinding aid in a ball mill or attritor mill, in the presence of a grinding liquid medium. Examples of grinding aids include higher fatty acids, such as oleic acid, stearic acid, isostearic acid, lauric acid, palmitic acid, and myristic acid; as well as aliphatic amines, aliphatic amides, and aliphatic alcohols. Examples of grinding liquid media include aliphatic hydrocarbons, such as a mineral spirit.

The aluminum pigment is broadly categorized into leafing-type aluminum pigments and non-leafing-type aluminum pigments, according to the type of grinding aid. A leafing-type aluminum pigment added to a paint composition is oriented (leafing) on the surface of the coating film formed by applying the paint composition, providing a finish with a strong metal feeling, while exhibiting thermal reflex and an antirust effect. Thus, a leafing-type aluminum pigment is often used in tanks, ducts, pipes, and rooftop roofing, and in various building materials. The first colored paint (X) preferably contains a non-leafing-type aluminum pigment from the standpoint of darkness etc. of the resulting multilayer coating film.

Regarding the size, the aluminum pigment preferably has an average particle size within the range of 5 to 30 μm from the standpoint of darkness of the resulting multilayer coating film. The average particle size is more preferably within the range of 7 to 25 μm, and particularly preferably within the range of 8 to 23 μm. The thickness is preferably within the range of 0.05 to 5 μm. "Average particle size" as used herein refers to the median size in a volume-weighted particle size distribution measured by laser diffraction scattering with a Microtrac MT3300 particle size distribution analyzer (trade name, produced by Nikkiso Co., Ltd.). "Thickness" as used herein is defined as the average value determined by measuring the thickness using image processing software while observing the cross-sectional surface of a coating film that contains the aluminum pigment with a microscope, and calculating the average value of 100 or more particles.

When the first colored paint (X) contains the aluminum pigment, the pigment mass concentration of the aluminum pigment is not particularly limited, and is, in a preferred embodiment, 1 to 50%, preferably 3 to 40%, and still more preferably 5 to 20%, based on the solids content of the first colored paint (X), from the standpoint of darkness of the resulting multilayer coating film.

From the standpoint of suppressing color unevenness and suppressing color change due to film thickness change of the resulting multilayer coating film, it is preferred to use a colored aluminum pigment as at least one of the aluminum pigments described above.

The colored aluminum pigment for use typically comprises an aluminum flake as a base material whose surface is coated with a colored layer.

Examples of the colored aluminum pigment include a pigment comprising an aluminum flake whose surface is chemisorbed with a color pigment via a thermopolymer having one or more double bonds and two or more carboxyl groups, the thermopolymer being obtained by thermal polymerization of one or more double bond-containing carboxylic acids; and a pigment comprising an aluminum flake whose surface is chemisorbed with a color pigment and is further coated thereon with a polymer obtained from a radically polymerizable unsaturated carboxylic acid and a monomer containing three or more radically polymerizable double bonds.

Here, the radically polymerizable unsaturated carboxylic acid represents a carboxylic acid having one or more radically polymerizable unsaturated groups. As used herein, a radically polymerizable unsaturated group means an unsaturated group that can undergo radical polymerization. Examples of such polymerizable unsaturated groups include a vinyl group, and a (meth)acryloyl group.

Here, the color pigment determines the hue of a colored aluminum pigment. Color pigments for use can be suitably selected from known organic or inorganic pigments. Specific examples of color pigments for use include organic pigments, such as azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, anthraquinone pigments, dioxazine pigments, threne pigments, and indigo pigments. Of these, it is preferred to use a phthalocyanine pigment from the standpoint of the hue and chroma of the resulting multilayer coating film.

In addition to the pigment comprising an aluminum flake whose surface is coated with a color pigment, the colored aluminum pigment for use may also be a pigment comprising an aluminum flake whose surface is coated with a metal oxide such as iron oxide by a gas phase method or a liquid phase method.

Regarding the size, the colored aluminum pigment preferably has an average particle size within the range of 5 to 30 μm from the standpoint of suppressing color change due to film thickness change and suppressing color unevenness of the resulting multilayer coating film. The average particle size is more preferably within the range of 7 to 25 μm, and particularly preferably within the range of 8 to 23 μm. The thickness is preferably within the range of 0.05 to 5 μm.

When the first colored paint (X) contains the colored aluminum pigment, the pigment mass concentration of the colored aluminum pigment is not particularly limited, and is, in a preferred embodiment, 0.1 to 30%, preferably 0.5 to 20%, and still more preferably 1 to 10%, based on the solids content of the first colored paint (X), from the standpoint of suppressing color unevenness and suppressing color change due to film thickness change of the resulting multilayer coating film.

Further, from the standpoint of improving the chroma and darkness of the resulting multilayer coating film, suppressing color change due to film thickness change, and suppressing color unevenness, it is preferred to use a colored aluminum pigment and non-colored aluminum pigment in combination as the aluminum pigment.

When a colored aluminum pigment and a non-colored aluminum pigment are used in combination as the aluminum pigment, the ratio of the colored aluminum pigment and the non-colored aluminum pigment is not particularly limited. In a preferred embodiment, from the standpoint of improving the chroma and darkness of the resulting multilayer coating film, suppressing color unevenness, and suppressing color change due to film thickness change, the mass ratio of the colored aluminum pigment to the non-colored aluminum pigment is within the range of 95/5 to 1/99, preferably 90/10 to 10/90, and still more preferably 80/20 to 10/90.

The vapor deposition metal flake pigment is typically obtained by vapor depositing a metal film on a base material, peeling the base material, and then grinding the vapor deposition metal film. Examples of the base material include films.

The material of the above metal is not particularly limited. Examples include aluminum, gold, silver, copper, brass, titanium, chromium, nickel, nickel chromium, and stainless steel. Of these, aluminum or chromium is particularly preferable, from the standpoints of, for example, availability and convenience in handling. A vapor deposition aluminum flake pigments obtained by vapor depositing aluminum as the material of the metal can be used as the aluminum pigment.

The interference pigments are effect pigments typically obtained by coating the surface of transparent or translucent flaky base materials, such as natural mica, synthetic mica, glass, silica, iron oxide, aluminum oxide, and various metal oxides, with metal oxides with different refractive indices. The interference pigments can be used singly or in a combination of two or more.

Natural mica is a flaky base material obtained by pulverizing mica from ore. Synthetic mica is synthesized by heating an industrial material, such as $SiO_2$, MgO, $Al_2O_3$, $K_2SiF_6$, or $Na_2SiF_6$, to melt the material at a high temperature of about 1500° C.; and cooling the melt for crystallization. When compared with natural mica, synthetic mica contains a smaller amount of impurities, and has a more uniform size and thickness. Specific examples of synthetic mica base materials include fluorophlogopite ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), and LiNa taeniolite ($LiMg_2LiSi_4O_{10}F_2$).

Examples of the metal oxides for coating the base material include titanium oxide and iron oxide. Interference pigments can develop various different interference colors depending on the difference in the thickness of the metal oxide.

Specific examples of the interference pigment include the metal oxide-coated mica pigments, metal oxide-coated alumina flake pigments, metal oxide-coated glass flake pigments, and metal oxide-coated silica flake pigments described below.

Metal oxide-coated mica pigments are pigments obtained by coating the surface of a natural mica or synthetic mica base material with a metal oxide.

Metal oxide-coated alumina flake pigments are pigments obtained by coating the surface of an alumina flake base material with a metal oxide. Alumina flakes refer to flaky (thin) aluminum oxides, which are typically clear and colorless. Alumina flakes do not necessarily consist of only aluminum oxide, and may contain other metal oxides.

Metal oxide-coated glass flake pigments are pigments obtained by coating the surface of a flaky glass base material with a metal oxide. The metal oxide-coated glass flake pigments have a smooth base material surface, which causes intense light reflection.

Metal oxide-coated silica flake pigments are typically pigments obtained by coating flaky silica, a base material having a smooth surface and a uniform thickness, with a metal oxide.

Examples of the color pigment contained in the first colored paint (X) include titanium oxide pigments, iron oxide pigments, titanium yellow pigments, azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, anthraquinone pigments, dioxazine pigments, threne pigments, indigo pigments, and carbon black pigments. These color pigments may be used singly or in a combination of two or more. Of these, it is preferred to use a phthalocyanine pigment from the standpoint of the hue and chroma of the resulting multilayer coating film.

The pigment mass concentration of the color pigment contained in the first colored paint (X) is 1 to 50%, preferably 3 to 40%, and still more preferably 5 to 20%, based on the solids content of the first colored paint (X), from the standpoint of the hue and chroma of the resulting multilayer coating film.

The first colored paint (X) may generally contain a resin component as a vehicle. As a resin component, a thermosetting resin composition is preferably used. Specific examples thereof include thermosetting resin compositions comprising a base resin having crosslinkable functional groups (e.g., hydroxy), such as acrylic resin, polyester resin, alkyd resin, and urethane resin, and a crosslinking agent, such as melamine resin, urea resin, and a polyisocyanate compound (including a blocked polyisocyanate compound). Such thermosetting resin compositions are dissolved or dispersed in a solvent such as an organic solvent and/or water, before use. The proportion of the base resin and the crosslinking agent in the resin composition is not particularly limited. The crosslinking agent is typically used within the range of 10 to 100 mass %, preferably 20 to 80 mass %, and more preferably 30 to 60 mass %, based on the total base resin solids content.

The first colored paint (X) may optionally further suitably contain solvents, such as water or an organic solvent; various additives for paints, such as a rheology control agent, a pigment dispersant, an antisettling agent, a curing catalyst, an antifoaming agent, an antioxidizing agent, and an ultraviolet absorber; and an extender pigment.

The first colored paint (X) can be applied by a method such as electrostatic coating, air spray coating, and airless spray coating. The film thickness of the first colored coating film is not particularly limited, and is preferably about 1 to 40 μm, more preferably 3 to 30 μm, and still more preferably about 5 to 20 μm on a cured coating film basis, from the standpoint of improving the chroma and darkness and suppressing color unevenness of the resulting multilayer coating film.

The solids content of the first colored paint (X) is not particularly limited, and is, for example, within the range of 10 to 65 mass %, preferably 15 to 55 mass %, and still more preferably 20 to 50 mass %. Further, it is preferred that the viscosity of the first colored paint (X) be suitably adjusted with water and/or an organic solvent to a range suitable for coating, which is typically 500 to 5000 mPa·s as measured with a Brookfield type viscometer at a rotational speed of 6 rpm at 20° C.

Before the second colored paint (Y) described below is applied, the first colored coating film may be subjected to the preheating, air-blowing, and the like under such heating conditions that the coating film is not substantially cured. Preheating is performed at a temperature of preferably 40 to 100° C., more preferably 50 to 90° C., and still more preferably 60 to 80° C. for preferably 30 seconds to 15 minutes, more preferably 1 to 10 minutes, and still more preferably 2 to 5 minutes. Air-blowing can be performed, for example, by blowing, onto the coated surface of a substrate, air heated to an ordinary temperature or to a temperature of 25° C. to 80° C. for 30 seconds to 15 minutes.

Step (2)

According to the method of the present invention, a second colored paint (Y) is then applied to the first colored coating film formed in step (1) to form a second colored coating film. The second colored paint (Y) is a paint that enhances the chroma and improves darkness of the resulting multilayer coating film. The second colored paint (Y) contains a color pigment as an essential component.

The second colored coating film has a light transmittance at a wavelength of 400 nm or more and 700 nm or less within the range of 15% or more and less than 30%. When the light transmittance is 15% or more, the resulting multilayer coating film has excellent chroma. Further, when the light transmittance is less than 30%, the resulting multilayer coating film has excellent darkness. In particular, the second colored coating film preferably has a light transmittance at a wavelength of 400 nm or more and 700 nm or less of 17 to 29%, and more preferably 20 to 28%, from the standpoint of chroma and darkness of the resulting multilayer coating film.

As used here, the light transmittance at a wavelength of 400 nm or more and 700 nm or less of the second colored coating film can be measured by the following method.

First, the second colored paint (Y) is applied to a polypropylene plate, followed by curing. Next, the cured coating film is peeled off and collected, and a light transmittance at a wavelength of 400 nm or more and 700 nm or less is measured with a spectrophotometer. In the present invention, the "light transmittance at a wavelength of 400 nm or more and 700 nm or less" refers to an average value of light transmittance at wavelengths in the range of 400 nm or more and 700 nm or less. The spectrophotometer may be, for example, a UV-2700 (trade name, produced by Shimadzu Corporation).

Examples of the color pigment contained in the second colored paint (Y) include inorganic pigments, such as complex oxide pigments such as titanium oxide pigments, iron oxide pigment, and titan yellow; organic pigments, such as azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, anthraquinone pigments, dioxazine pigments, threne pigments, and indigo pigments; and carbon black pigments. These color pigments may be used singly or in a combination of two or more. Of these, it is preferred to use a phthalocyanine pigment from the standpoint of the hue and chroma of the resulting multilayer coating film.

The pigment mass concentration of the color pigment contained in the second colored paint (Y) is not particularly limited, and is, in a preferred embodiment, 0.1 to 10%, preferably 1 to 9%, and more preferably 3 to 8%, based on the solids content of the second colored paint (Y), from the standpoint of the chroma and darkness of the resulting multilayer coating film.

It is preferred that the second colored paint (Y) further contains an effect pigment.

The effect pigment for use here may be any effect pigment mentioned above in the description of step (1).

The effect pigment is preferably an interference pigment, and more preferably a metal oxide-coated alumina flake pigment, from the standpoint of suppressing color unevenness of the resulting multilayer coating film.

Regarding the size, the effect pigment preferably has an average particle size within the range of 5 to 30 μm from the standpoint of suppressing color unevenness of the resulting multilayer coating film. The average particle size is more preferably within the range of 7 to 25 μm, and particularly preferably within the range of 8 to 23 μm. The thickness is preferably within the range of 0.05 to 5 μm.

When the second colored paint (Y) contains the effect pigment, the pigment mass concentration of the effect pigment is not particularly limited, and is, in a preferred embodiment, 1.2 to 5%, preferably 1.3 to 4%, and more preferably 1.5 to 3%, based on the solids content of the second colored paint (Y), from the standpoint of suppressing color unevenness of the resulting multilayer coating film.

The second colored paint (Y) may generally contain a resin component as a vehicle. As a resin component, a thermosetting resin composition is preferably used. Specific examples thereof include thermosetting resin compositions comprising a base resin having crosslinkable functional groups (e.g., hydroxy), such as acrylic resin, polyester resin, alkyd resin, and urethane resin, and a crosslinking agent, such as melamine resin, urea resin, and a polyisocyanate compound (including a blocked polyisocyanate compound). Such thermosetting resin compositions are dissolved or dispersed in a solvent such as an organic solvent and/or water, before use. The proportion of the base resin and the crosslinking agent in the resin composition is not particularly limited. The crosslinking agent is typically used within the range of 10 to 100 mass %, preferably 20 to 80 mass %, and more preferably 30 to 60 mass %, based on the total base resin solids content.

The second colored paint (Y) may further suitably contain solvents, such as water or an organic solvent; various additives for paints, such as a rheology control agent, a pigment dispersant, an antisettling agent, a curing catalyst, an antifoaming agent, an antioxidizing agent, and an ultraviolet absorber; and an extender pigment; if necessary.

The second colored paint (Y) can be applied by a method such as electrostatic coating, air spray coating, and airless spray coating. The film thickness of the second colored coating film is not particularly limited, and is, in a preferred embodiment, about 1 to 30 μm, more preferably about 3 to 20 μm, and still more preferably about 5 to 15 μm on a cured coating film basis, from the standpoint of the chroma and darkness of the resulting multilayer coating film.

The solids content of the second colored paint (Y) is not particularly limited, and is, in a preferred embodiment, within the range of 10 to 65 mass %, preferably 15 to 55 mass %, and still more preferably 20 to 50 mass %. Further, it is preferred that the viscosity of the second colored paint (Y) be suitably adjusted with water and/or an organic solvent to a range suitable for coating, which is typically 500 to 5000 mPa·s as measured with a Brookfield type viscometer at a rotational speed of 6 rpm at 20° C.

Before the clear paint (Z) described below is applied, the second colored coating film may be subjected to the preheating, air-blowing, and the like under such heating conditions that the coating film is not substantially cured. Preheating is performed at a temperature of preferably 40 to 100° C., more preferably 50 to 90° C., and still more preferably 60 to 80° C. for preferably 30 seconds to 15 minutes, more preferably 1 to 10 minutes, and still more preferably 2 to 5 minutes. Air-blowing can be performed, for example, by blowing, onto the coated surface of a substrate, air heated to an ordinary temperature or to a temperature of 25° C. to 80° C. for 30 seconds to 15 minutes.

Step (3)

According to the method of the present invention, a clear paint (Z) is applied to the second colored coating film, which is obtained by applying the second colored paint (Y) as described above, to form a clear coating film.

The clear paint (Z) for use in the method according to the present invention may be any known clear paint. Specific examples include liquid or powdery clear paints that contain a resin component composed of a base resin and a crosslinking agent as an essential component, and optional components such as additives for paints and a solvent (e.g., water or an organic solvent); and that form a colorless or colored transparent coating film.

Examples of base resins include resins that have crosslinkable functional groups (e.g., hydroxyl, carboxyl, silanol, and epoxy), such as acrylic resin, polyester resin, alkyd resin, fluorine resin, urethane resin, and silicon-containing resin. Examples of crosslinking agents include compounds or resins that have a functional group reactive with the functional groups of the base resin, such as melamine resin, urea resin, polyisocyanate compounds, block polyisocyanate compounds, epoxy compounds or resins, carboxy-containing compounds or resins, acid anhydrides, and alkoxy silyl group-containing compounds or resins.

The proportion of the base resin and the crosslinking agent in the resin component is not particularly limited. Typically, the amount of the crosslinking agent for use is in the range of 10 to 100 mass %, preferably 20 to 80 mass %, and more preferably 30 to 60 mass % based on the total solids content of the base resin.

The clear paint (Z) may optionally contain a solvent such as water and an organic solvent; and additives for paints such as a curing catalyst, an antifoaming agent, an ultraviolet absorber, a rheology control agent, and an antisettling agent.

The clear paint (Z) may also suitably contain a color pigment to the extent that the transparency of the coating film is not impaired. The color pigment for use can be a known pigment for ink or paint, and these pigments can be used singly or in a combination of two or more. Although the amount of the color pigment for use varies, for example, depending on the type of color pigment for use, the amount of the color pigment is typically in the range of 30 mass % or less, preferably 0.05 to 20 mass %, and more preferably 0.1 to 10 mass % based on the total solids content of the resin component in the clear paint.

The clear paint (Z) can be applied by a method such as electrostatic coating, air spray coating, and airless spray coating. The film thickness of the clear coating film is not particularly limited, and is, in a preferred embodiment, about 10 to 60 μm, more preferably about 15 to 50 μm, and still more preferably about 20 to 40 μm on a cured coating film basis.

The solids content of the clear paint (Z) is not particularly limited, and is, in a preferred embodiment, in the range of 10 to 65 mass %, preferably 15 to 55 mass %, and still more preferably 20 to 50 mass %. Further, it is preferred that the viscosity of the clear paint (Z) be suitably adjusted with water and/or an organic solvent to a range suitable for coating, which is typically about 15 to 60 seconds, and particularly about 20 to 50 seconds as measured with a Ford cup No. 4 viscometer at 20° C.

Step (4)

According to the method of the present invention, the first colored coating film formed in step (1), the second colored coating film formed in step (2), and the clear coating film formed in step (3) are heated separately or simultaneously to cure these films.

In particular, from the standpoint of, for example, energy-saving, the first colored coating film, the second colored coating film, and the clear coating film are preferably heated simultaneously.

Heating can be performed with a known technique, such as a hot-blast furnace, an electric furnace, or an infrared-guided heating furnace. The heating temperature is preferably in the range of 70 to 150° C., and more preferably 80 to 140° C. The heating time is not particularly limited; and is preferably in the range of 10 to 40 minutes, and more preferably 20 to 30 minutes.

Base Material

The base material to which the method of the present invention is applied can be any base material. Examples include members formed of metal, such as iron, zinc, aluminum, or magnesium; members formed of alloys of these metals; members plated with these metals, or members on which these metals are deposited; and members formed of, for example, glass, plastic, or foam of various materials. In particular, steel and plastic materials that constitute vehicle bodies are suitable, with steel being particularly suitable. These members can be optionally subjected to a treatment such as degreasing or surface treatment.

These members on which an undercoating film and/or an intermediate coating film are formed may also be used as a base material. In the present invention, it is preferable to use these base materials.

The undercoating film is applied to the surface of a member to hide the surface of the member, or impart anticorrosion properties and rust resistance to the member. The undercoating film can be formed by applying an undercoat paint, and curing it. This undercoat paint can be any undercoat paint; and may be a known paint, such as an electrodeposition paint or a solvent-based primer.

The intermediate coating film is applied to a base with an intention to hide the surface of a member or base such as the undercoating film, enhance the adhesion between the undercoating and the top coating film, or impart chipping resistance to the coating film. The intermediate coating film can be formed by applying an intermediate paint to the surface of a base such as the surface of a member or undercoating film, and curing the paint. The intermediate paint for use can be any known intermediate paint. For example, an organic solvent-based or aqueous intermediate paint containing a thermosetting resin composition and a color pigment can be preferably used.

When a member having an undercoating film and/or intermediate coating film formed thereon is used as a base material in the method of the present invention, the undercoating film and/or intermediate coating film is cured by heating beforehand, and then the first colored paint (X) of step (1) can be applied. The first colored paint (X) can also be applied with the undercoating film and/or intermediate coating film being uncured. In particular, from the standpoint of energy-saving, the first colored paint (X) is preferably applied with the intermediate coating film being uncured.

Formation of Multilayer Coating Film

According to the method of the present invention, a multilayer coating film is formed by performing the following steps (1) to (4):

step (1): applying a first colored paint (X) containing an effect pigment and a color pigment to form a first colored coating film, step (2): applying a second colored paint (Y) containing a color pigment to the first colored coating film to form a second colored coating film, step (3): applying a clear paint (Z) to the second colored coating film to form a clear coating film, and step (4): heating the first colored coating film formed in step (1), the second colored coating film formed in step (2), and the clear coating film formed in step (3) separately or simultaneously to cure these coating films. The first colored coating film has a lightness L* within the range of 30 to 60, the second colored coating film has a light transmittance at a wavelength of 400 nm or more and 700 nm or less within the range of 15% or more and less than 30%, and |h(X)−h(S)|, which is a difference between a hue angle h in the L*C*h color space diagram of the first colored coating film (h(X)) and a hue angle h in the L*C*h color space diagram of the multilayer coating film (h(S)), is within the range of 0 to 30. Accordingly, the method can form a multilayer coating film with a high chroma, excellent darkness, reduced color change due to film thickness change, and reduced color unevenness.

When |h(X)−h(S)|, which is a difference between the hue angle h in the L*C*h color space diagram of the first colored coating film (h(X)) and the hue angle h in the L*C*h color space diagram of the multilayer coating film (h(S)), is 30 or less, the resulting multilayer coating film has reduced color change due to film thickness change and reduced color unevenness.

The upper limit of |h(X)−h(S)|, which is a difference between the hue angle h in the L*C*h color space diagram of the first colored coating film (h(X)) and the hue angle h in the L*C*h color space diagram of the multilayer coating film (h(S)), is not particularly limited as long as it is 30 or less. The upper limit is preferably 25 or less, more preferably 20 or less, and still more preferably 15 or less. The lower limit of |h(X)−h(S)|, which is a difference between the hue angle h in the L*C*h color space diagram of the first colored coating film (h(X)) and the hue angle h in the L*C*h color space diagram of the multilayer coating film (h(S)), is not particularly limited, and is, for example, 0.1 or more, 0.2 or more, 0.3 or more, or 0.5 or more. Further, |h(X)−h(S)|, which is a difference between the hue angle h in the L*C*h color space diagram of the first colored coating film (h(X)) and the hue angle h in the L*C*h color space diagram of the multilayer coating film (h(S)), is preferably within the range of 0 to 25, more preferably within the range of 0 to 20, and still more preferably within the range of 0 to 15. From the standpoint of suppressing color change due to film thickness change and suppressing color unevenness of the resulting multilayer coating film, |h(X)−h(S)|, which is a difference between the hue angle h in the L*C*h color space diagram of the first colored coating film (h(X)) and the hue angle h in the L*C*h color space diagram of the multilayer coating film (h(S)), is preferably within the above ranges.

The hue angle h in the L*C*h color space diagram of the multilayer coating film (h(S)) is preferably within the range of 225 to 315, more preferably within the range of 240 to 310, and still more preferably within the range of 255 to 305.

The hue angle h in the L*C*h color space diagram of the first colored coating film (h(X)) and the hue angle h in the L*C*h color space diagram of the multilayer coating film (h(S)) can be adjusted by adjusting the type and amount of pigments contained in the first colored paint (X), the second colored paint (Y), and the clear paint used to form a multilayer coating film (by performing small-scale experiments).

Thus, the method for forming a multilayer coating film according to the present invention can be suitably used in forming a multilayer coating film on a variety of industrial products, in particular exterior panels of vehicle bodies.

The following describes the present invention in more detail, with reference to Examples and Comparative Examples. However, the present invention is not limited to these Examples. Note that "parts" and "%" are on a mass basis, and the film thickness is on a cured coating film basis.

EXAMPLES

[1] Preparation of Base Material

A steel plate degreased and treated with zinc phosphate (JIS G 3141, size: 400 mm×300 mm×0.8 mm) was coated with Elecron GT-10 cationic electrodeposition paint (trade name; produced by Kansai Paint Co., Ltd.; a blocked polyisocyanate compound is used as a curing agent in an epoxy-resin polyamine-based cationic resin) by electrodeposition such that the coated film had a film thickness of 20 μm on a cured coating film basis. The coated film was heated at 170° C. for 20 minutes to allow the coated film to be crosslinked and cured, thereby forming an electrodeposition coating film.

The obtained electrodeposition coating film on the steel plate was coated with WP-523H N-5.5 (trade name; Kansai Paint Co., Ltd.; aqueous intermediate paint; the obtained intermediate coating film had a lightness L* of 55) by using air spray such that the film thickness was 30 μm on a cured coating film basis; and allowed to stand for 3 minutes, followed by preheating at 80° C. for 3 minutes, thereby forming an uncured intermediate coating film. This plate was determined to be a base material.

[2] Preparation of Paint

Production of Hydroxy-Containing Acrylic Resin Emulsion (a)

Production Example 1

70.7 parts of deionized water and 0.52 parts of Aqualon KH-10 (trade name; produced by DKS Co., Ltd.; emulsifier, active ingredient 97%) were placed into a reaction vessel equipped with a thermometer, a thermostat, a stirrer, a reflux condenser, and a dropping funnel; and mixed and stirred in a nitrogen stream, followed by heating to 80° C. Subsequently, 1% of the entire monomer emulsion described below and 5 parts of a 6% ammonium persulfate aqueous solution were introduced into the reactor vessel, and the mixture was maintained at 80° C. for 15 minutes. Thereafter, the remaining monomer emulsion was added dropwise to the reaction vessel maintained at the same temperature for 3 hours. After completion of the dropwise addition, the mixture was aged for 1 hour. Thereafter, while 40 parts of a 5% 2-(dimethylamino)ethanol aqueous solution was gradually added to the reaction vessel, the reaction product was cooled to 30° C. and discharged while being filtered through a 100-mesh nylon cloth, thereby obtaining a hydroxy-containing acrylic resin emulsion (a) with a solids concentration of 45%. The obtained hydroxy-containing acrylic resin had a hydroxy value of 43 mg KOH/g and an acid value of 12 mg KOH/g.

Monomer Emulsion: 50 parts of deionized water, 10 parts of styrene, 40 parts of methyl methacrylate, 35 parts of ethyl acrylate, 3.5 parts of n-butyl methacrylate, 10 parts of 2-hydroxy ethyl methacrylate, 1.5 parts of acrylic acid, 1.0 part of Aqualon KH-10, and 0.03 parts of ammonium persulfate were mixed with stirring, thereby obtaining a monomer emulsion.

Production of Hydroxy-Containing Polyester Resin Solution (b)

Production Example 2

174 parts of trimethylolpropane, 327 parts of neopentyl glycol, 352 parts of adipic acid, 109 parts of isophthalic acid, and 101 parts of 1,2-cyclohexanedicarboxylic anhydride were placed in a reaction vessel equipped with a thermometer, a thermostat, a stirrer, a reflux condenser, and a water separator; and the temperature was increased from 160° to 230° C. over a period of 3 hours. Thereafter, the temperature was maintained at 230° C. while the generated condensed water was distilled off with the water separator to allow the reaction to proceed until the acid value reached 3 mg KOH/g or less. 59 parts of trimellitic anhydride was added to this reaction product, and addition reaction was performed at 170° C. for 30 minutes, followed by cooling to 50° C. or less. 2-(dimethylamino)ethanol in an equivalent amount to acid groups was added thereto to neutralize the reaction product; and then deionized water was gradually added, thereby obtaining a hydroxy-containing polyester resin solution (b) with a solids concentration of 45%. The obtained hydroxy-containing polyester resin had a hydroxy value of 128 mg KOH/g, an acid value of 35 mg KOH/g, and a weight average molecular weight of 13,000.

Production of Pigment Dispersion Pastes (P-1) to (P-5)

Production Example 3

56 parts (solids content: 25 parts) of the hydroxy-containing polyester resin solution (b) obtained in Production Example 2, 5 parts of chlorinated copper cyanine blue G-314 (trade name, a phthalocyanine blue pigment, produced by Sanyo Color Works Ltd.), 1 part of Paliogen Blue L6482 (trade name, threne-based blue pigment, produced by BASF), 1.5 parts of Magenta B RT-355-D (trade name, a quinacridone red pigment, produced by BASF), 1.5 parts of Hostaperm Violet RL Special (trade name, a dioxazine pigment, produced by Clariant), 0.01 parts of Titanix JR-903 (trade name, an inorganic titanium white pigment, produced by Tayca Corporation), 0.01 parts of Raven 5000 Ultra III Beads (trade name, a carbon black pigment, produced by Columbian Carbon Co.), and 5 parts of deionized water were mixed, and the mixture was adjusted to a pH of 8.0 with 2-(dimethylamino)ethanol. Subsequently, the obtained mixture was placed in a wide-mouth glass bottle, and glass beads (diameter: about 1.3 mm) as dispersion media were added thereto. The bottle was hermetically sealed, and the mixture was dispersed with a paint shaker for 30 minutes, thereby obtaining a pigment dispersion paste (P-1).

Production Examples 4 to 7

The procedure of Production Example 3 was repeated except that the formulations shown in Table 1 below were applied, thereby obtaining pigment dispersion pastes (P-2) to (P-5). The formulations shown in Table 1 are indicated on a solids mass basis.

TABLE 1

| | | Production Example | | | | |
|---|---|---|---|---|---|---|
| | | 3 | 4 | 5 | 6 | 7 |
| Pigment dispersion paste name | | P-1 | P-2 | P-3 | P-4 | P-5 |
| Color pigment | G314 (Note 1) | 5 | 3 | 8.5 | 5 | 2.5 |
| | L6482 (Note 2) | 1 | | | 1 | |
| | RT355D (Note 3) | 1.5 | | | 1 | |
| | RL Special (Note 4) | 1.5 | 0.5 | 1.5 | 1 | |
| | JR 903 (Note 5) | 0.01 | 0.01 | 0.01 | 0.01 | 0.01 |
| | R5000 (Note 6) | 0.01 | 0.01 | 0.01 | 1 | 0.01 |

G314 (Note 1): a phthalocyanine blue pigment, trade name: chlorinated copper cyanine blue G-314, produced by Sanyo Color Works Ltd.

L6482 (Note 2): a threne-based blue pigment, trade name: Paliogen Blue L6482, produced by BASF RT355D (Note 3): a quinacridone red pigment, trade name: Magenta B RT-355-D, produced by BASF RL Special (Note 4): a dioxazine pigment, trade name: Hostaperm Violet RL Special, produced by Clariant JR903 (Note 5): an inorganic titanium white pigment, trade name: Titanix JR903, produced by Tayca Corporation R5000 (Note 6): a carbon black pigment, trade name: Raven 5000 Ultra III Beads, produced by Columbian Carbon Co.

Production of Effect Pigment Dispersions (R-1) to (R-5)

Production Example 8

4.1 parts (solids content: 3 parts) of GX-180A (trade name, an aluminum pigment paste, produced by Asahi Kasei Metals Corporation, metal content: 74%), 7.8 parts (solids content: 6 parts) of GX-3108 (trade name, an aluminum pigment paste, produced by Asahi Kasei Metals Corporation, metal content: 77%), 2 parts (solids content: 2 parts) of Friend Color D9452BL (trade name, a colored aluminum pigment, produced by Toyo Aluminium K.K.), 35 parts of 2-ethyl-1-hexanol, 8 parts (solids content: 4 parts) of the following phosphate group-containing resin solution (c), and 0.2 parts of 2-(dimethylamino)ethanol were homogeneously mixed in a stirring-mixing vessel, thereby obtaining an effect pigment dispersion (R-1).

Phosphate Group-Containing Resin Solution (c): A combined solvent containing 27.5 parts of methoxy propanol and 27.5 parts of isobutanol was placed in a reaction vessel equipped with a thermometer, a thermostat, a stirrer, a reflux condenser, and a dropping funnel; and heated to 110° C.

121.5 parts of a mixture containing 25 parts of styrene, 27.5 parts of n-butyl methacrylate, 20 parts of isostearyl acrylate (trade name, produced by Osaka Organic Chemical Industry Ltd., branched, higher alkyl acrylate), 7.5 parts of 4-hydroxybutyl acrylate, 15 parts of the following phosphate group-containing polymerizable monomer, 12.5 parts of 2-methacryloyloxyethyl acid phosphate, 10 parts of isobutanol, and 4 parts of t-butylperoxy octanoate was added to the combined solvent over a time period of 4 hours. A mixture containing 0.5 parts of t-butylperoxy octanoate and 20 parts of isopropanol was further added dropwise thereto for 1 hour, followed by aging with stirring for 1 hour, thereby obtaining a phosphate group-containing resin solution (c) with a solids concentration of 50%. This resin had an acid value due to the phosphate groups of 83 mg KOH/g, a hydroxy value of 29 mg KOH/g, and a weight average molecular weight of 10,000.

Phosphate Group-Containing Polymerizable Monomer: 57.5 parts of monobutyl phosphate and 41 parts of isobutanol were placed in a reaction vessel equipped with a thermometer, a thermostat, a stirrer, a reflux condenser, and a dropping funnel; and heated to 90° C. 42.5 parts of glycidyl methacrylate was then added dropwise over a period of 2 hours, followed by aging with stirring for 1 hour. Thereafter, 59 parts of isopropanol was added, thereby obtaining a phosphate group-containing polymerizable monomer solution with a solids concentration of 50%. The obtained monomer had an acid value due to the phosphate groups of 285 mg KOH/g.

Production Examples 9 to 12

The procedure of Production Example 8 was repeated except that the formulations shown in Table 2 below were applied, thereby obtaining effect pigment dispersions (R-2) to (R-5). The formulations shown in Table 2 are indicated on a solids mass basis.

TABLE 2

| | | Production Example | | | | |
|---|---|---|---|---|---|---|
| | | 8 | 9 | 10 | 11 | 12 |
| Effect pigment dispersion name | | R-1 | R-2 | R-3 | R-4 | R-5 |
| Effect pigment | GX-180A | 3 | | 2 | 3 | |
| | GX-3108 | 6 | 8 | 7 | 6 | 12 |
| | Friend color D9452BL | 2 | 3 | | | |

Production of First Colored Paints (X-1) to (X-6)

Production Example 13

70.02 parts of the pigment dispersion paste (P-1) obtained in Production Example 3, 57.1 parts of the effect pigment dispersion (R-1) obtained in Production Example 8, 44.4 parts (solids content: 20 parts) of the hydroxy-containing acrylic resin emulsion (a) obtained in Production Example 1, 60 parts (solids content: 21 parts) of UCOAT UX-8100 (trade name, a urethane emulsion, produced by Sanyo Chemical Industries, Ltd., solids content: 35%), and 37.5 parts (solids content: 30 parts) of Cymel 325 (trade name, a melamine resin, produced by Nihon Cytec Industries Inc., solids content: 80%) were homogeneously mixed. Subsequently, UH-752 (trade name, produced by ADEKA Corporation, a thickening agent), 2-(dimethylamino)ethanol, and deionized water were added to the obtained mixture, thereby obtaining a first colored paint (X-1) with a pH of 8.0, a paint solids content of 25%, and a viscosity of 3000 mPa·s as measured with a Brookfield viscometer at 20° C. at a rotational speed of 6 rpm.

Production Examples 14 to 18

The procedure of Production Example 13 was repeated except that the formulations shown in Table 3 below were applied, thereby obtaining first colored paints (X-2) to (X-6) with a viscosity of 3000 mPa·s as measured with a Brookfield viscometer at 20° C. at a rotational speed of 6 rpm.

Evaluation of First Colored Coating Film

The lightness L* and hue angle h (h(x)) of the first colored coating films formed from the obtained first colored paints (X-1) to (X-6) was evaluated with a CR-400 (trade name; produced by Konica Minolta, Inc.). The first colored coating films were obtained by applying each of the first colored paints (X-1) to (X-6) to the base material obtained in section [1] above such that the film thickness was 8 μm on a cured coating film basis by using a rotary electrostatic mini bell coater at a booth temperature of 20° C. and a humidity of 75%, allowing the film to stand at room temperature for 3 minutes, and then heating the film at 140° C. for 30 minutes in a hot-air circulating oven. Table 3 also shows the evaluation results.

TABLE 3

| | | Production Example | | | | | |
|---|---|---|---|---|---|---|---|
| | | 13 | 14 | 15 | 16 | 17 | 18 |
| First colored paint name | | X-1 | X-2 | X-3 | X-4 | X-5 | X-6 |
| Pigment dispersion paste name | | P-1 | P-2 | P-3 | P-1 | P-4 | P-5 |
| Effect pigment dispersion name | | R-1 | R-2 | R-3 | R-4 | R-1 | R-5 |
| Amount of color pigment added | | 9.02 | 3.52 | 10.02 | 9.02 | 9.01 | 2.52 |
| Pigment mass concentration of color pigment | | 7.52% | 3.07% | 8.42% | 7.64% | 7.51% | 2.20% |
| Amount of effect pigment added | | 11 | 11 | 9 | 9 | 11 | 12 |
| Pigment mass concentration of effect pigment | | 9.2% | 9.6% | 7.6% | 7.6% | 9.2% | 10.5% |
| First colored coating film | Lightness L* | 40 | 55 | 42 | 38 | 20 | 70 |
| | Hue angle h (h(X)) | 289 | 273 | 282 | 285 | 280 | 256 |

Production of Hydroxy-Containing Acrylic Resin Emulsion (d)

Production Example 19

130 parts of deionized water and 0.52 parts of Aqualon KH-10 were placed in a reaction vessel equipped with a thermometer, a thermostat, a stirrer, a reflux condenser, and a dropping funnel; and stirred and mixed in a nitrogen airstream, followed by heating to 80° C. Subsequently, 1% of the entire amount of the following monomer emulsion (1) and 5.3 parts of a 6% ammonium persulfate aqueous solution were placed in the reaction vessel and maintained at 80° C. for 15 minutes. Thereafter, the remaining monomer emulsion (1) was added dropwise into the reaction vessel maintained at the same temperature over a period of 3 hours. After completion of the dropwise addition, the mixture was aged for 1 hour. Subsequently, the following monomer emulsion (2) was added dropwise over a period of 1 hour, followed by aging for 1 hour. Thereafter, while 40 parts of a 5% dimethylethanol amine aqueous solution was gradually added to the reaction vessel, the reaction product was cooled to 30° C. and discharged while being filtered through a 100-mesh nylon cloth, thereby obtaining a hydroxy-containing acrylic resin emulsion (d) having a solids concentration of 30%. The obtained hydroxy-containing acrylic resin had a hydroxy value of 25 mg KOH/g and an acid value of 33 mg KOH/g.

Monomer emulsion (1): 42 parts of deionized water, 0.72 parts of Aqualon KH-10, 2.1 parts of methylenebisacrylamide, 2.8 parts of styrene, 16.1 parts of methyl methacrylate, 28 parts of ethyl acrylate, and 21 parts of n-butyl acrylate were mixed with stirring, thereby obtaining monomer emulsion (1).

Monomer emulsion (2): 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed with stirring, thereby obtaining monomer emulsion (2).

Production of Hydroxy-Containing Polyester Resin Solution (e)

Production Example 20

109 parts of trimethylol propane, 141 parts of 1,6-hexanediol, 126 parts of hexahydrophthalic anhydride, and 120 parts of adipic acid were placed in a reaction vessel equipped with a thermometer, a thermostat, a stirrer, a reflux condenser, and a water separator; and heated to increase the temperature from 160° C. to 230° C. over a time period of 3 hours, followed by a condensation reaction at 230° C. for 4 hours. Subsequently, in order to add carboxyl groups to the obtained condensation reaction product, 38.3 parts of trimellitic anhydride was further added, and the mixture was allowed to react at 170° C. for 30 minutes. The reaction product was then diluted with 2-ethyl-1-hexanol, thereby obtaining a hydroxy-containing polyester resin solution (e) with a solids concentration of 70%. The obtained hydroxy-containing polyester resin had a hydroxy value of 150 mg KOH/g, an acid value of 46 mg KOH/g, and a weight average molecular weight of 6,400.

Production of Pigment Dispersion Pastes (P-6) to (P-9)

Production Example 21

35.7 parts (solids content: 25 parts) of the hydroxy-containing polyester resin solution (e) obtained in Production Example 20, 7.5 parts of chlorinated copper cyanine blue G-314 (trade name, a phthalocyanine blue pigment, produced by Sanyo Color Works Ltd.), 0.01 parts of Raven 5000 Ultra III Beads (trade name, a carbon black pigment, produced by Columbian Carbon Co.), and 5 parts of deionized water were mixed, and the mixture was adjusted to a pH of 8.0 with 2-(dimethylamino)ethanol. Subsequently, the obtained mixture was placed in a wide-mouth glass bottle, and glass beads (diameter: about 1.3 mm) were added as dispersion media. The bottle was hermetically sealed, and the mixture was dispersed with a paint shaker for 30 minutes, thereby obtaining a pigment dispersion paste (P-6).

Production Examples 22-24

The procedure of Production Example 21 was repeated except that the formulations shown in Table 4 below were applied, thereby obtaining pigment dispersion pastes (P-7) to (P-9). The formulations shown in Table 4 are indicated on a solids mass basis.

TABLE 4

| | | Production Example | | | |
|---|---|---|---|---|---|
| | | 21 | 22 | 23 | 24 |
| Pigment dispersion paste name | | P-6 | P-7 | P-8 | P-9 |
| Color pigment | G314 (Note 1) | 7.5 | 11 | 16 | 2.7 |
| | R5000 (Note 6) | 0.01 | 0.01 | 0.01 | 0.01 |

Production of Effect Pigment Dispersions (R-6) to (R-7)

Production Example 25

2 parts of Xirallic T60-23 WNT Galaxy Blue (trade name, titanium-oxide-coated alumina oxide flakes, produced by Merck & Co., Inc.), 10 parts of 2-ethyl-1-hexanol, 4 parts (solids content: 2 parts) of the phosphate group-containing resin solution (c), and 0.1 parts of 2-(dimethylamino)ethanol were homogeneously mixed in a stirring-mixing vessel, thereby obtaining an effect pigment dispersion (R-6).

Production Example 26

2 parts of Pyrisma T40-23 SW Color Space Blue (trade name, titanium-oxide-coated mica flakes, produced by Merck & Co., Inc.), 10 parts of 2-ethyl-1-hexanol, 4 parts (solids content: 2 parts) of the phosphate group-containing resin solution (c), and 0.1 parts of 2-(dimethylamino)ethanol were homogeneously mixed in a stirring-mixing vessel, thereby obtaining an effect pigment dispersion (R-7).

Production of Second Colored Paints (Y-1) to (Y-6)

Production Example 27

48.21 parts of the pigment dispersion paste (P-6) obtained in Production Example 21, 16.1 parts of the effect pigment dispersion (R-6) obtained in Production Example 25, 73.3 parts (solids content: 22 parts) of the hydroxy-containing acrylic resin emulsion (d) obtained in Production Example 19, 60 parts (solids content: 21 parts) of UCOAT UX-8100 (trade name, a urethane emulsion, produced by Sanyo Chemical Industries, Ltd., solids content: 35%), and 37.5 parts (solids content: 30 parts) of Cymel 325 (trade name: a melamine resin, produced by Nihon Cytec Industries Inc., solids content: 80%) were homogeneously mixed. Subsequently, UH-752 (trade name, produced by Adeka Corporation, a thickening agent), 2-(dimethylamino) ethanol, and deionized water were added to the obtained mixture, thereby obtaining a second colored paint (Y-1) with a pH of 8.0, a paint solids content of 25%, and a viscosity of 3000 mPa·s as measured at 20° C. and at a rotational speed of 6 rpm with a Brookfield viscometer.

Production Examples 28 to 32

Production Example 27 was repeated except that the formulations shown in Table 5 below were applied, thereby obtaining second colored paints (Y-2) to (Y-6) with a viscosity of 3000 mPa·s as measured at 20° C. and at a rotational speed of 6 rpm with a Brookfield viscometer.

Evaluation of Second Colored Coating Film

Free films of the second colored coating films of the second colored paints (Y-1) to (Y-6) obtained above were evaluated with a UV-2700 (trade name, produced by Shimadzu Corporation), and a light transmittance at a wavelength of 400 nm or more and 700 nm or less was obtained. The free films of the second colored coating films were obtained by applying each of the second colored paints (Y-1) to (Y-6) to a polypropylene plate such that the film thickness was 10 μm on a cured coating film basis by using a rotary electrostatic mini bell coater at a booth temperature of 20° C. and a humidity of 75%, allowing the film to stand at room temperature for 3 minutes, and then heating the film at 140° C. for 30 minutes in a hot-air circulating oven, followed by peeling off. Table 5 also shows the evaluation results.

TABLE 5

| | | Production Example | | | | | |
|---|---|---|---|---|---|---|---|
| | | 27 | 28 | 29 | 30 | 31 | 32 |
| Second colored paint name | | Y-1 | Y-2 | Y-3 | Y-4 | Y-5 | Y-6 |
| Pigment dispersion paste name | | P-6 | P-6 | P-7 | P-6 | P-8 | P-9 |
| Effect pigment dispersion name | | R-6 | R-7 | R-6 | | R-6 | R-6 |
| Amount of color pigment added | | 7.51 | 7.51 | 11.01 | 7.51 | 16.01 | 2.71 |
| Pigment mass concentration of color pigment | | 6.86% | 6.86% | 9.74% | 6.99% | 13.57% | 2.59% |
| Amount of effect pigment added | | 2 | 2 | 2 | 0 | 2 | 2 |
| Pigment mass concentration of effect pigment | | 1.8% | 1.8% | 1.8% | 0.0% | 1.7% | 1.9% |
| Second colored coating film | Light transmittance at a wavelength of 400 nm or more and 700 nm or less | 27% | 27% | 19% | 27% | 12% | 35% |

basis. The coated film was allowed to stand at room temperature for 3 minutes, and then preheated at 80° C. for 3 minutes, thereby obtaining an uncured second colored coating film.

Coating with Clear Paint (Z)

A clear paint (Z) (Magicron KINO-1210, trade name, produced by Kansai Paint Co., Ltd., an acrylic-resin, epoxy-curable, solvent-type topcoat clear paint) was applied to the uncured second colored coating film with a rotary electrostatic mini bell coater at a booth temperature of 20° C. and at a humidity of 75% such that the coating film had a film thickness of 35 μm on a cured coating film basis. The coating film was then allowed to stand at room temperature for 7 minutes; and then heated in a hot-air circulating oven at 140° C. for 30 minutes to cure a multilayer coating film composed of the intermediate coating film, the first colored coating film, the second colored coating film, and the clear coating film by drying simultaneously, thereby preparing a test plate 1.

A test plate 2 was obtained in the same manner as in the preparation of test plate 1, except that the film thickness of the second colored coating film on a cured coating film basis was changed to 9 μm.

A test plate 3 was obtained in the same manner as in the preparation of test plate 1, except that the film thickness of the second colored coating film on a cured coating film basis was changed to 11 μm.

[III] Preparation of Test Plate

Preparation of Test Plate

Examples 1 to 8 and Comparative Examples 1 to 4

Coating with First Colored Paint (X)

One of the first colored paints (X-1) to (X-6) prepared in section [2] was applied to the base material prepared in section [1] with a rotary electrostatic mini bell coater at a booth temperature of 20° C. and at a humidity of 75% such that the coating film had a thickness of 8 μm on a cured coating film basis. The coated film was then allowed to stand at room temperature for 3 minutes, thereby obtaining an uncured first colored coating film.

Coating with Second Colored Paint (Y)

One of the second colored paints (Y-1) to (Y-6) prepared in section [2] was applied to the uncured first colored coating film with a rotary electrostatic mini bell coater at a booth temperature of 20° C. and at a humidity of 75% such that the coating film had a thickness of 10 μm on a cured coating film basis.

Evaluation of Coating Film

The appearance of the coating films on the test plates obtained in the above manner was evaluated by the following method. Tables 6 and 7 show the results.

Hue Angle h (h(S))

The hue angle h of each test plate 1 was measured with a CR-400 (trade name, produced by Konica Minolta, Inc.).

Chroma C*

The C* value of each test plate 1 was measured with a CR-400 (trade name, produced by Konica Minolta, Inc.). A higher C* value represents a higher degree of chroma. A value of 55 or higher was considered to be acceptable.

Darkness C*/L*

Each test plate 1 was evaluated by measuring the chroma C* and lightness L* with a CR-400 (trade name, produced by Konica Minolta, Inc.), and dividing the C* value by the L* value (C* value/L* value). A larger value of the C* value/L* value represents a higher degree of darkness. A value of 1.8 or higher was considered to be acceptable.

Color Change Due to Film Thickness Change

The ΔE* values of each test plate 2 and each test plate 3 were evaluated with a CR-400 (trade name, produced by Konica Minolta, Inc.). The ΔE* value was calculated according to the following formula. A smaller ΔE* value represents less color change due to film thickness change. A value of 1.5 or less was considered to be acceptable.

$$\Delta E=\{(\Delta L^*)^2+(\Delta a^*)^2+(\Delta b^*)^2\}^{1/2}$$

ΔL*: Difference in the L* value between the test plate 2 and the test plate 3,

Δa*: Difference in the a* value between the test plate 2 and the test plate 3,

Δb*: Difference in the b* value between the test plate 2 and the test plate 3.

Color Unevenness

The color unevenness of each test plate was visually evaluated. S and A were considered to be acceptable.

S: Almost no color unevenness was observed, and the coating film had an extremely excellent appearance.

A: Color unevenness was slightly observed, but the coating film had an excellent appearance.

B: Color unevenness was observed, and the coating film had a somewhat poor appearance.

C: Color unevenness was greatly observed, and the coating film had a poor appearance.

Hue Difference: |h(X)−h(S)|

The difference between the hue angle h in the L*C*h color space diagram of the first colored coating film (h(X)) and the hue angle h in the L*C*h color space diagram of the multilayer coating film (h(S)) (i.e., |h(X)−h(S)|) was calculated.

The invention claimed is:

1. A method for forming a multilayer coating film, comprising step (1): applying a first colored paint (X) containing an effect pigment and a color pigment to form a first colored coating film, step (2): applying a second colored paint (Y) containing a color pigment to the first colored coating film to form a second colored coating film, step (3): applying a clear paint (Z) to the second colored coating film to form a clear coating film, and step (4): heating the first colored coating film formed in step (1), the second colored coating film formed in step (2), and the clear coating film formed in step (3) separately or simultaneously to cure these coating films, wherein the first colored coating film has a lightness L* within the range of 30 to 60, the second colored coating film has a light transmittance at a wavelength of 400 nm or more and 700 nm or less within the range of 15% or more and less than 30%,

|h(X)−h(S)|, which is a difference between a hue angle h in the L*C*h color space diagram of the first colored coating film (h(X)) and a hue angle h in the L*C*h color space diagram of the multilayer coating film (h(S)), is within the range of 0 to 30, and the multilayer coating film obtained by the method for forming a multilayer coating film has a hue angle h (h(S)) in the L*C*h color space diagram within the range of 225 to 315.

TABLE 6

| | | Example | | | | | | | |
|---|---|---|---|---|---|---|---|---|---|
| | | 1 | 2 | 3 | 4 | 5 | 6 | 7 | 8 |
| First colored paint name | | X-1 | X-2 | X-1 | X-1 | X-3 | X-4 | X-1 | X-4 |
| Second colored paint name | | Y-1 | Y-1 | Y-2 | Y-3 | Y-1 | Y-1 | Y-4 | Y-4 |
| Multilayer | Hue angle h (h(S)) | 298 | 290 | 299 | 297 | 297 | 295 | 296 | 295 |
| coating | Chroma C* | 61.0 | 65.1 | 60.8 | 63.2 | 63.6 | 61.5 | 59.5 | 60.2 |
| film | Darkness C*/L* | 2.4 | 2.4 | 2.4 | 2.1 | 2.3 | 2.4 | 2.3 | 2.4 |
| | Color change due to film thickness change ΔE* | 0.7 | 1.5 | 0.7 | 1.5 | 1.4 | 1.2 | 1.0 | 1.3 |
| | Color unevenness | S | A | S | S | S | S | S | A |
| \|h(X) − h(S)\| | | 9 | 17 | 10 | 8 | 15 | 10 | 7 | 10 |

TABLE 7

| | | Comparative Example | | | |
|---|---|---|---|---|---|
| | | 1 | 2 | 3 | 4 |
| First colored paint name | | X-5 | X-6 | X-1 | X-1 |
| Second colored paint name | | Y-1 | Y-1 | Y-5 | Y-6 |
| Multilayer | Hue angle h (h(S)) | 293 | 289 | 297 | 275 |
| coating film | Chroma C* | 22.7 | 67.5 | 30.0 | 63.7 |
| | Darkness C*/L* | 1.4 | 2.3 | 1.0 | 1.8 |
| | Color change due to film thickness change ΔE* | 0.2 | 2.5 | 1.2 | 4.2 |
| | Color unevenness | S | C | S | C |
| \|h(X) − h(S)\| | | 13 | 33 | 8 | 14 |

2. The method for forming a multilayer coating film according to claim 1, wherein the color pigment in the first colored paint (X) and the color pigment in the second colored paint (Y) contain a phthalocyanine pigment.

3. The method for forming a multilayer coating film according to claim 1, wherein the effect pigment contained in the first colored paint (X) contains a colored aluminum pigment.

4. The method for forming a multilayer coating film according to claim 1, wherein the second colored paint (Y) contains the color pigment in a pigment mass concentration within the range of 0.1 to 10%.

5. The method for forming a multilayer coating film according to claim 1, wherein the second colored paint (Y) further contains an effect pigment.

6. The method for forming a multilayer coating film according to claim 5, wherein the second colored paint (Y) contains the effect pigment in a pigment mass concentration within the range of 1.2 to 5%.

* * * * *